United States Patent [19]

Moore et al.

[11] 4,354,228

[45] Oct. 12, 1982

[54] FLEXIBLE PROCESSOR ON A SINGLE SEMICONDUCTOR SUBSTRATE USING A PLURALITY OF ARRAYS

[75] Inventors: Victor S. Moore, Deerfield Beach; Wayne R. Kraft, Coral Springs; Joseph C. Rhodes, Jr., Boca Raton; William L. Stahl, Jr., Coral Springs, all of Fla.

[73] Assignee: International Business Machines Corporation, Armonk, N.Y.

[21] Appl. No.: 105,711

[22] Filed: Dec. 20, 1979

[51] Int. Cl.³ .............................................. G06F 7/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,892,957 | 7/1975 | Bryant | 364/200 |
| 3,949,370 | 4/1976 | Reyling, Jr. et al. | 364/200 |
| 3,959,774 | 5/1976 | Mead | 364/200 |
| 3,983,538 | 9/1976 | Jones | 364/900 |
| 4,144,561 | 3/1979 | Tu et al. | 364/200 |
| 4,237,542 | 12/1980 | Cukier | 364/900 |

Primary Examiner—Raulfe B. Zache
Attorney, Agent, or Firm—Richards, Harris & Medlock

[57] ABSTRACT

A processor is provided that is fabricated on a single semiconductor substrate. The processor includes an AND array for receiving program instructions from input sources external of the processor and for generating product signals. An OR array is provided and interconnected to the AND array for receiving the product signals and for generating a plurality of control signals. A register array receives ones of the plurality of control signals and transfers data between the processor and data sources external of the processor. An arithmetic and logic unit array is also provided on the semiconductor substrate and interconnected to the register array and the OR array for executing operations on data received from the register array in accordance with ones of the plurality of control signals to generate output data. A control register is further provided and is interconnected to the OR array and the AND array for receiving ones of the plurality of control signals for controlling execution of the program instructions within the AND array.

34 Claims, 4 Drawing Figures

FLEXIBLE PROCESSOR ON A SINGLE SEMICONDUCTOR SUBSTRATE USING A PLURALITY OF ARRAYS

TECHNICAL FIELD

This invention relates to computer systems, and more particularly to a processor fabricated on a single semiconductor substrate utilizing array structures to provide flexibility.

BACKGROUND ART

In existing computing systems utilizing a central processing unit coupled to many different input/output (I/O) devices, such as printers, display systems, mass storage units and the like, a problem exists in coupling the central processing unit to each of the I/O devices. In the past, where the main central processing unit was used to control each of the I/O devices, it soon became overloaded and unable to function as a processor. This problem was solved by utilizing separate, generally smaller processing units, known as I/O controllers, to control the I/O devices. The I/O controller processors were controlled by the central processor to do a specific task relating to the control of the I/O device.

In the present state of the art, it is necessary that a wide variety of different processing units exist due to the inflexible and fixed design of processors and the widely varying tasks processors can perform. For example, in some I/O devices a very powerful processor is needed, while for others, a much less powerful processor is required. This fact became a serious problem for the computer system user when the user desired to upgrade a part of his system. For example, if a user desired to replace a slow printer with a much faster printer, the printer controller used with the slow printer may not be capable of handling the faster printer and the printer controller as well as the printer would have to be replaced. On the other hand, if the user replaced his central processor unit and desired to keep his existing printer, he may still have to replace his printer controller, or at least purchase a translator, since the old printer controller may not respond to the new central processor's commands.

In designing processors, whether they are for use as a main central processor, an I/O controller processor, or utilized to replace random logic functions, many problems exist due to the necessity of providing so many different types of processors for so many different uses. One solution to these problems, of course, would be to design a maximum processor and use it for all applications. This, unfortunately, becomes too great an expense burden to the products in which the maximum processor is to be used. In utilizing the different types of processors for different functions, great expense occurs in the design of these different processors. It is a complex matter to design a new processor even if it is one based on the design of another type of processor. Long periods of time and great expense are required for such simple things as determining the paths of electrical connections between the semiconductor elements of the processor. This is particularly true where the processor is the type known as a microprocessor, that is, a processor built on a single semiconductor substrate. As semiconductor technology advances, allowing more and more elements to be placed on a single semiconductor substrate, the problems of designing the conductor paths between the elements become more and more complex.

A problem adding to the cost and complexity of laying out semiconductor paths between the elements is the desire to minimize the size of the substrate. Traditionally, the art teaches that it is desirable to make the semiconductor substrate as small as possible to maximize the yields in the manufacture of semiconductive components. This, however, is in direct conflict with the desire to increase the processing power (and hence the number of elements) for microprocessors. The traditional solution to this conflict has been to add more elements on a minimized substrate and add considerable complexity to the design and layout of the conductor paths between the elements. This solution has increased both the developmental costs and the time required to develop new microprocessors.

It would be preferable to design a microprocessor with a maximum of flexibility to allow expansion or contraction as desired, even if it is at the expense of increased substrate area in order to reduce the cost and time to develop a new microprocessor. This can be done by utilizing array technology, such as program logic arrays, for the major functional units of the microprocessor. By proper arrangement of arrays on a single substrate, an entire microprocessor can be fabricated which can be expanded or contracted in size and power with little difficulty and expense in terms of cost and time.

Another problem with conventional microprocessors is that they can respond only to a single given set of instructions. An instruction set designed for one microprocessor may very well be meaningless to another type of microprocessor, especially where the second microprocessor is manufactured by a different party. This creates problems for the microprocessor user when designing new systems because old software is no longer useable if a new microprocessor is used. Also, where a new microprocessor controlled I/O controller is obtained for use with an existing central processor, the central processor may have difficulty communicating with the new I/O controller unless special interface circuits are first obtained. One of the advantages of building a microprocessor using a programmed logic array is that the array can be reprogrammed by the user to respond to a different set of instructions. This creates a very powerful tool having a wide variety of uses and eliminates many of the problems associated with changing computer equipment.

In program logic array configured microprocessors, another advantage is achieved in that clocking signals, interrupt signals and the like can be treated as data input signals to the program logic arrays. This allows a great deal of flexibility. In particular, a program logic array configured microprocessor can respond to a wide variety of different types of clocking signals or, if desired, no independent clocking signals need be used. In that situation, the provision of data to the array causes a self-clocking of the functional units to occur. Interrupt flexibility is also achieved by treating the interrupt signals as data signals, since any desired number of interrupt signals can be provided to the processor by properly programming the arrays.

In accordance with the present invention, a processor fabricated on a single semiconductor substrate includes an AND array for receiving program instructions from input sources external of the processor and for generating product signals. An OR array is provided that is interconnected to the AND array for receiving the product signals and for generating a plurality of control signals. A register array receives ones of the plurality of control signals and transfers data between the processor and data sources external of the processor. An arithmetic and logic unit array is provided which is interconnected to the register array and the OR array for executing operations on data received from the register array in accordance with ones of the plurality of control signals for generating output data. A control register array is interconnected to the OR array and the AND array for receiving ones of the plurality of control signals for controlling execution of the program instructions within the AND array.

In accordance with another aspect of the present invention, a processor is provided and includes an AND array for receiving program instructions, clock pulses and interrupt signals from input sources external of the processor and for generating product signals. The processor further includes an OR array interconnected to the AND array for receiving the product signals and for generating a plurality of control signals. A register array is provided for receiving ones of the plurality of control signals and for transferring data between the processor and data sources external of the processor. An arithmetic and logic unit array is included within the processor and is interconnected to the register array and the OR array for executing operations on data received from the register array in accordance with ones of the plurality of control signals for generating output data. The processor further includes a controller register array interconnected to the OR array and the AND array for receiving ones of the plurality of control signals for controlling execution of the program instructions within the AND array. An output register array is provided which is interconnected to receive the output data and ones of the plurality of control signals for buffering the output data between the arithmetic and logic unit array and logic circuitry external of the processor. A multiplexer register array is interconnected to the register array and to data sources external of the processor for controlling flow of data to the register array under control of ones of the plurality of control signals. Additionally, a condition code register array is provided which is interconnected to the arithmetic and logic unit array for storing condition information generated by the arithmetic and logic unit array for application to the AND array. The processor is fabricated on a single semiconductor substrate.

In accordance with yet another aspect of the present invention, a processor is fabricated on a single semiconductor substrate and includes an AND array for receiving input signals from sources external of the processor and for generating output signals along product signal lines. An OR array is provided and is disposed adjacent to the AND array on the semiconductor substrate. The OR array is interconnected to the product lines for generating control signals along control lines perpendicularly disposed to the product lines. A register array is disposed on the semiconductor substrate adjacent the OR array for receiving the control signals along register signal lines, wherein the register signal lines lie perpendicularly to the control signal lines. An arithmetic and logic unit array is disposed adjacent the register array and the AND array for receiving data from the register array along the register signal lines for generating output data.

In accordance with still another aspect of the present invention, a processor fabricated on a single semiconductor substrate for operating on data includes an AND array responsive to the application thereto of a coded input signal from sources external the substrate for providing a coded product signal having a coded state related to the code of the input signal. The product signal is provided to product signal conduction paths positioned generally along a linear path on the substrate. An OR array is positioned on the substrate to be connected with the product signal conduction paths for receiving the product signal and for generating a coded control signal on control signal conduction paths. The coded state of the control signal is related to the state of the product signal. The control signal conduction paths are positioned generally along a linear path substantially perpendicular to the product signal conduction paths. A register array is positioned on the substrate to be connected with at least a first portion of the control signal conduction paths for affecting the reception or provision of the data on data conduction paths in accordance with the state of the control signal on the first portion of the control signal conduction paths. The data conduction paths are positioned generally along a linear path substantially perpendicular to the control signal conduction paths. An output structure is positioned on the substrate to be connected with the data conduction paths and at least a second portion of the control signal conduction paths for providing data to the data conduction paths from the external sources or to the external sources from the data conduction paths in accordance with the state of the control signal on the second portion of the control signal conduction paths.

BRIEF DESCRIPTION OF DRAWINGS

For a more detailed description of the present invention and for further objects and advantages thereof, reference is made to the following Description, taken in conjunction with the accompanying Drawings in which.

DESCRIPTION OF THE PREFERRED EMBODIMENT

Figure 1:
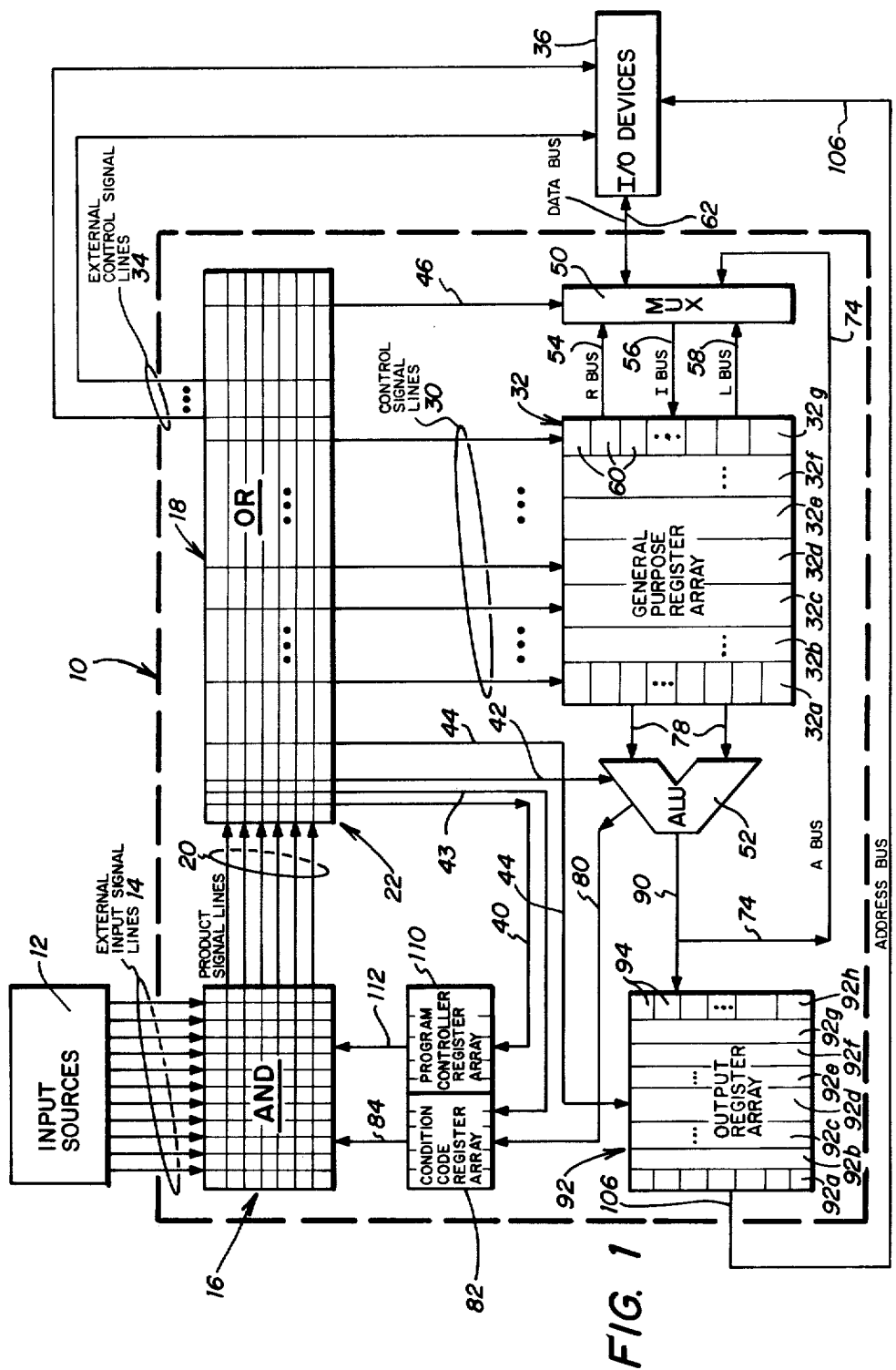
FIG. 1 is a schematic block diagram of the processor of the present invention.

Referring to FIG. 1, the present processor is generally identified by the numeral 10. The boundaries of processor 10 are indicated by the dashed lines which also define the boundaries of a semiconductor substrate or chip on which all components of processor 10 are fabricated. The substrate may comprise, for example, silicon semiconductor material. Since processor 10 is built on a single substrate, it may be thought of as a microprocessor.

All control information to processor 10 is provided by input sources 12 via external input signal lines 14. Input sources 12 may generate, for example, program instructions, microprocessor interrupt signals, clock pulses and external status information signals. It is important to note that all such control information is applied to processor 10 via external input signal lines 14.

Input information generated by input sources 12 is applied via external input signal lines 14 to an AND array generally identified by the numeral 16. The outputs of AND array 16 are applied via product signal lines 20 to an OR array generally identified by the numeral 18. AND array 16 and OR array 18 comprise a programmable logic array structure 22 which can implement a cause and effect relationship between the inputs 14 and the outputs of OR array 18.

A programmable logic array comprises the logical equivalent of a multiplicity of input lines, and multiplicity of AND gates connected to produce respective partial products of signals on the input lines and true compliments thereof. No AND gate is coupled to both a signal on an input line and the true compliment of that signal. A programmable logic array further includes a multiplicity of OR gates which produce logical sums of the outputs of respective groups of the AND gates. This arrangement is such that at least some of the sets of outputs from the OR gates can be produced by different sets of signals on the input lines to enable a logic equation to be expressed as a sum of products or as a product of sums. Essentially, the AND array 16 of processor 10 generates the product terms and OR array 18 generates the sum of the product terms. AND array 16 and OR array 18 may be thought of as a read only memory with a programmable, non-exhaustive decode section that is adapted to implementation of random logic. Programmable logic array 22 can be designed to be selectably custom programmed with a particular instruction set in a known manner, such as the manner in which a programmable read only memory (PROM) is designed and programmed.

The inputs via external input signal lines 14 govern the activation of product signal lines 20. More than one product signal line 20 may be active at a given time. Active product signal lines 20 enable control lines generally identified by the numeral 30 as perscribed by the programming, or personalization, of OR array 18. Control signal lines 30 apply their output to a general purpose register array (GPRA) generally identified by the numeral 32. Additionally, OR array 18 generates control signals via external control signal lines 34 for application to I/O devices 36 such as, for example, printers, tape drives, card readers, memory devices and channel attachment logic. Additionally, OR array 18 generates control signals for processor 10 via signal lines 40, 42, 43, 44 and 46, whose operation will be subsequently described. It will be understood that although one line is used in FIG. 1 to illustrate each of signal lines 30, 34, 40, 42, 43, 44 and 46, this representation is for illustration purposes only and each of these signal lines may include one or more signal lines.

An important aspect of the present invention is the use of programmable logic array 22 which allows processor 10 to be custom programmed for use with different instruction sets. For instance, where the signals applied from input sources 12 contain a binary code manifesting a computer instruction such as, add the data in register A to the data in register B, one or more product signal lines 20 of AND array 16 will become activated and cause a micro-instruction in OR array 18 to be provided for generating one or more control signal outputs on control signal lines 30, 34, 40, 42, 43, 44 or 46 to effect the instruction. Programming changes in programmable logic array 22 affect the resulting control signal generated which controls the operation of processor 10.

Programmable logic array 22 can also be considered, as previously stated, as a programmable read only memory (PROM) with programmable addresses as well as programmable data portions. If an address input occurs that has not been programmed, no word of programmable logic array 22 will be accessed and the outputs on product signal 35 lines 20 will be zeros. If an address input occurs which has been programmed for more than one word, the contents of several words will be logically ORed together to form the output along control signal lines 30. When programming addresses, each bit of the address can be programmed as "1", a "0" or "don't care". Bits programmed as "don't care" will be ignored in the address decoding and thus several different addresses may be made to access the same word of programmable logic array 22. By employing programmable logic array 22, only the addresses and words required for a particular function need be implemented as opposed to all addresses and words which are implemented with read only memory structures.

Referring again to FIG. 1, general purpose register array 32 is located between a multiplexer register array 50 and an arithmetic and logic unit (ALU) register array 52. General purpose register array 32 is composed of one or more registers in which information passes to and from these registers via the right (R) bus 54, input (I) bus 56 and left (L) bus 58. Buses 54, 56 and 58 are coupled to each bit position 60 of each of the registers comprising general purpose register array 32. General purpose register array 32 is illustrated as having registers 32a–32g. A control signal line 30 is applied to each of the registers within general purpose register array 32.

General purpose register array 32 may comprise standard registers in which a vector of flip-flops have their inputs gated to I bus 56 and their outputs gated to either R bus 54 or L bus 58. Activation of these gates is governed by control signal lines 30. A second type of register which can be implemented in general purpose register array 32 is a shift register in which arithmetic, logical and circular shifts are possible. A third type of register within general purpose register array 32 which can be implemented is a counter register which functions to increment or decrement the data stored. The output or OR array 18 via control signal lines 30 determines control of the counting registers. A fourth type of register that can be implemented in general purpose register array 32 is a buffer register for channeling data from either ALU 52, L bus 58 or R bus 54 to the I bus 56. With this arrangement, data from a register within general purpose register array 32 can be transferred to another register via a buffer register without involving ALU 52. General purpose register array 32 may also include devices that direct immediate data transfer from OR array 18 onto either R bus 54, I bus 56 or L bus 58.

Multiplexer register array 50 functions to route information between general purpose register array 32 and a data bus 62. Data bus 62 is bidirectional and receives or transfers data from I/O devices 36. Data travels from data bus 62 through multiplexer register array 50 to I bus 56, or is transferred from either R bus 54 or L bus 58 to data bus 62. Information from ALU 52 output along an A bus 74 can also be routed through multiplexer register array 50 to I bus 56 or data bus 62. Control of multiplexer register array 50 is generated by OR array 18 via control signal line 46.

The output of general purpose register array 32 is applied via signal lines 78 to ALU 52. ALU 52 may comprise, for example, a programmable logic array or random logic. ALU 52 may carry out standard ALU functions such as add, exclusive OR, compare and the like and provide for condition codes. Condition codes may include, for example, overflow, negative zero and carry. These condition codes are output from ALU 52 via signal line 80 to a condition code register (CCR) array 82. Condition codes are stored by condition code register array 82 for application to AND array 16 via signal line 84 under control of OR array 18 via control signal line 43.

The output of ALU 52 in the form of a computational result is applied via signal line 90 to an output register array generally identified by the numeral 92. Output register array 92 includes a plurality of registers identified by the numerals 92a-92h, each having a plurality of bit storage elements 94. Output register array 92 functions to save the result of an arithmetic calculation for transfer between ALU 52 and, for example, I/O device 36, via an address bus 106. Typically, the output of output register array 92 is an address to a computer memory or an I/O device and may be thought of as an address bus. Bus 106 is not bidirectional. Control for output register array 92 is provided from OR array 18 via control signal line 44. Thus, one use of output register array 92 is as a conventional instruction address register.

Processor 10 further includes a program controller register array 110 which receives an input from OR array 18 via control signal line 40. The output of program controller register array 110 is applied via a signal line 112 to AND array 16. Program controller register array 110 comprises a register to control the order in which programmable logic array 22 makes decisions. Program controller register array 110 permits processor 10 to execute more than one microword simultaneously in that the output of program controller register array 110 can point to more than one microword within AND array 16. For instance, if program counter 110 is initially set to zero and the response to the data on lines 14 results in a product line 20 being activated which is coupled to control line 43, then program counter 110 may be incremented to a count of one. This, in turn, causes a different product line 20 to be activated, which may also be coupled to control line 43 to thereafter cause yet another product line 20 to be activated. In this manner, a single high level instruction can be applied from input sources 12 and a plurality of microwords are provided at the output of OR array 18 to execute that high level instruction.

The present processor 10, having all components structured from array technology, provides for a very flexible controller. AND array 16 can be expanded to respond to a greater number of input signal lines 14 to facilitate a larger instruction set or the addition of clocking or interrupt lines. The interrupt lines may be encoded by AND array 16 so that individual interrupt signals can serve plural interrupt functions. The expansion of AND array 16 to respond to a greater number of input signal lines 14 may or may not require the expansion of the number of product signal lines 20. If additional product signal lines 20 are required, a corresponding increase in OR array 18 must occur to accommodate the additional product signal lines 20. The ranges of flexibility also include the ability to add to or delete from the registers in general purpose register array 32 or to increase or decrease their size by changing the number of bits within each register which comprise general purpose register array 32. As the number of bits change within general purpose register array 32, a compensating change in the number of bits in ALU 52 and output register array 92 must also be made. A further degree of flexibility is that additional registers can be added to output register array 92, for instance, to hold results of ALU 52 computations for output, on command, at a subsequent time under control of OR array 18. OR array 18 must also be expanded to accommodate the increased number of control signals needed as a result of expanding the number of registers in general purpose register array 32, output register array 92, or ALU 52.

Figure 2:
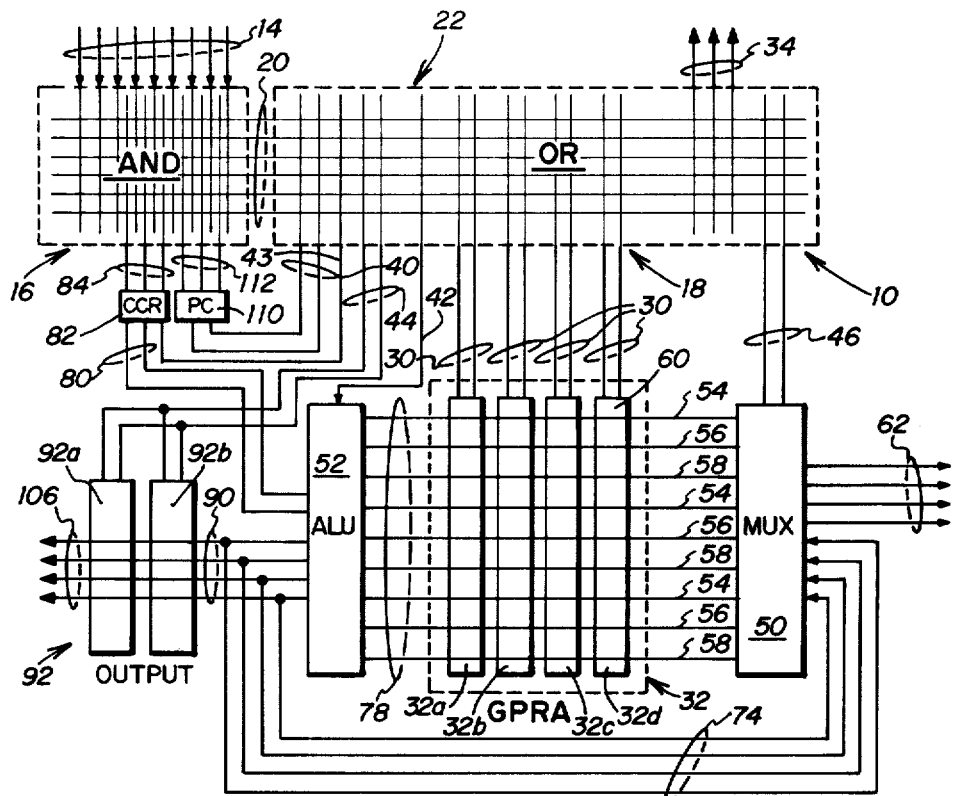
FIG. 2 is a schematic block diagram illustrating in greater detail the physical layout of the components of the processor of the present invention.

Referring now to FIG. 2, wherein like numerals are utilized for like and corresponding components previously identified, a more detailed illustration of processor 10 is shown to depict the array structures utilized in the fabrication of processor 10. An important aspect of the present invention that creates the flexibility and advantages of the present processor is in the use of array structures disposed such that horizontal and vertical interconnections can be facilitated. It can be seen from FIG. 2 that AND array 16 is disposed adjacent and horizontal to OR array 18 and that all product signal lines 20 are disposed perpendicular to external input signal lines 14 and external control signal lines 34. Control signal lines 30 are disposed perpendicular to product signal lines 20 and interconnect general purpose register array 32 which is disposed below OR array 18 on the semiconductor substrate from which processor 10 is fabricated. Similarly, signal lines interconnecting multiplexer register array 50, ALU 52 and output register array 92 are disposed horizontally and parallel to product signal lines 20.

It should be noted that in fabricating array structures, conductive paths can be built by either metal patterns or diffusion region patterns. By selecting the metal patterns to run in one general direction, such as horizontally, and the diffusion region patterns in the other direction, such as vertically, the interconnections between the main components of processor 10 can be made to allow a maximum flexibility of varying the size of any one main component with minimal effect on the electrical interconnections.

Through the use of array structures and the perpendicularity maintained between interconnection of arrays, the degrees of freedom and design flexibility of the present invention are achieved. The expandable nature of the arrays is facilitated using this structured and symmetrical type of wiring rather than random type wiring heretofor present in processors. For instance, if additional external input signal lines are desired, AND array 16 can be expanded horizontally to accommodate such additional input lines. This expansion has little, if any, effect on the wiring between other portions of processor 10. Similarly, if additional control signal lines are desired, for instance to control more registers, OR array 18 can be expanded horizontally with a corresponding horizontal expansion and increase in the number of registers of general purpose register array 32. In this case, the number of diffused region conduction paths between OR array 18 and general purpose register array 32 are increased, and this has little effect on the rest of processor 10. All other arrays including multiplexer register array 50, ALU 52, output register array 92, condition code register 82 and program controller register array 110 can be similarly expanded without the need for a complete redesign of the component configuration or electrical path interconnections of processor 10. It must be noted, of course, that the array structure layout shown in FIG. 2 does not make as efficient use of substrate area as conventional random type layouts. However, with the layout of this invention, as shown in FIG. 2, the redesign of processor 10 to increase or decrease functions is a simple matter. In the past, long periods of time were required to interconnect the circuits; now, such interconnections are a single matter, which can be automated through the use of existing computer programs for designing arrays.

Figure 3:
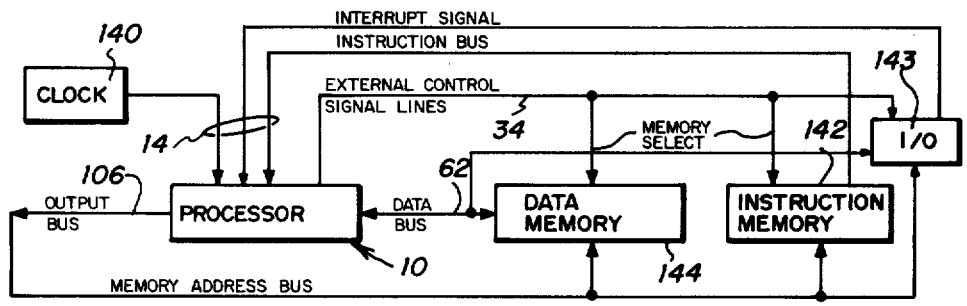
FIG. 3 is a schematic block diagram illustrating the use of the present processor as a conventional microprocessor.

FIG. 3 illustrates the use of the present processor functioning as a conventional computer in which an external clock input signal is provided from a clock source 140. Clock pulses are applied via an external input signal line 14 to processor 10. A second input signal is applied from an instruction memory 142 via an instruction bus via an external input signal line 14. A third input signal is applied to processor 10 as an interrupt signal from an input/output device 143 and may include a plurality of lines to indicate status, the need for servicing or the like. Processor 10 provides an output via external control signal lines 34 to one of two memories in the form of a memory select signal to select data from a data memory 144 or from instruction memory 142 or to issue commands to input/output device 143. The output of processor 10 on output bus 106 is used as a memory address bus for data memory 144, instruction memory 142 and input/output device 143 to provide an address to these memories or to select device 143. Data bus 62 provides data between processor 10 and data memory 144 and device 143.

Figure 4:
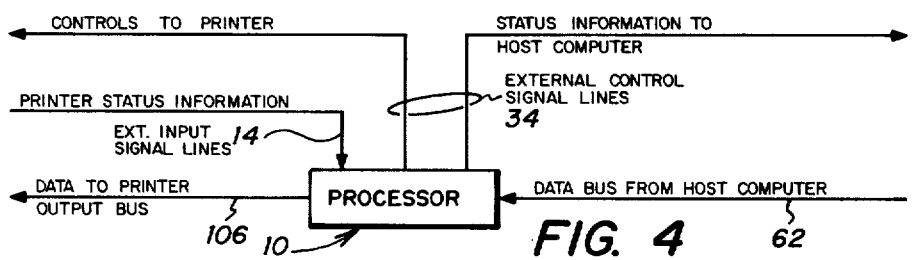
FIG. 4 illustrates the use of the present processor in a random logic configuration application, or an I/O controller.

FIG. 4 illustrates another implementation of processor 10 in which processor 10 functions without an external clock to operate on a cause effect basis. As illustrated in FIG. 4, processor 10 receives data from a host computer, converts the data to a printer format and outputs this data to a printer. Printer status information is received via an external input signal line 14. The converted data is output to a printer via output bus 106. Status information to a host computer is output from processor 10 via an external control signal line 34 to inform the host computer that a character is requested. The character itself will be input to processor 10 via data bus 62 from the host computer. An input to the printer is output via an external signal line 34 to inform the printer that a character is to be printed.

Processor 10 in the configuration illustrated in FIG. 4 operates without a clock and responds to whatever input that is applied via an external input signal line 14. Processor 10 operation is controlled solely by an input to processor 10 in the form of status information from the printer. The inputs to AND array 16 (FIG. 1) of processor 10 instruct processor 10 to perform various functions. The cause, or input signal, is applied to AND array 16, wherein it is decoded to produce a specific effect by operation of OR array 18 either internal to processor 10 by outputting data to control signal lines 30 or external to processor 10 by outputting data via external signal lines 34. Processor thus works asynchronously with I/O devices external to processor 10. The cause and effect relation operating capability of processor 10 can be changed by simply reprogramming programmable logic array 22 such that similar inputs to AND array 16 (FIG. 1) will cause different outputs from OR array 18. In this way programmable logic array 22 functions dynamically to enable processor 10 to be used with a variety of I/O devices by simply reprogramming programmable logic array 22.

It therefore can be seen that the present invention provides for a processor that has the flexibility and architectural independence not associated with previously developed processors. The processor of the present invention is comprised of array structures fabricated on a single semiconductor substrate which allows for efficient and simple physical design of the processor while permitting the necessary flexibility for increased input and output requirements. The cause and effect type operation of the present processor permits operation without clock systems either external or internal since the processor of the present invention is driven by its own inputs. Input flexibility of the present processor is also achieved in that external input signal lines may be treated as interrupt signals and in which external interrupt signal lines can be encoded to serve as plural interrupt signals. The program controller of the present processor permits for simultaneous execution of instructions within the processor.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A processor fabricated on a single semiconductor substrate comprising:

AND array means for receiving program instructions from input sources external of the processor and for generating product signals;

OR array means interconnected to said AND array means for receiving said product signals and for generating a plurality of control signals;

register means for receiving ones of said plurality of control signals and for transferring data between the processor and data sources external of the processor;

arithmetic and logic unit means interconnected to said register means and said OR array means, for executing operations on data received from said register means in accordance with ones of said plurality of control signals and for generating output data;

control register means interconnected to said OR array means and said AND array means for receiving ones of said plurality of control signals for controlling execution of said program instructions within said AND array means and;

output register means interconnected to receive said output data and ones of said plurality of control signals for buffering said output data between said arithmetic and logic unit means and said data sources external of the processor under control of ones of said plurality of control signals.

2. The processor of claim 1 wherein said AND array means and said OR array means comprise programmable logic array means.

3. The processor of claim 2 wherein said programmable logic array means is dynamically programmable.

4. The processor of claim 1 wherein said control register means controls simultaneous execution of a plurality of said program instructions.

5. The processor of claim 1 wherein said AND array means receives clock pulses from input sources external of the processor.

6. The processor of claim 1 wherein said AND array means receives interrupt signals from input sources external of the processor.

7. The processor of claim 1 wherein the size of said array means are selectively variable.

8. The processor of claim 1 wherein said semiconductor substrate comprises silicon semiconductor material.

9. A processor fabricated on a single semiconductor substrate comprising:
AND array means for receiving program instructions from input sources external of the processor and for generating product signals;
OR array means interconnected to said AND array means for receiving said product signals and for generating a plurality of control signals;
register means for receiving ones of said plurality of control signals and for transferring data between the processor and data sources external of the processor;
arithmetic and logic unit means interconnected to said register means and said OR array means, for executing operations on data received from said register means in accordance with ones of said plurality of control signals and for generating output data;
control register means interconnected to said OR array means and said AND array means for receiving ones of said plurality of control signals for controlling execution of said program instructions within said AND array means; and
multiplexer means interconnected to said register means and to data sources external of the processor for controlling flow of data to said register means under control of ones of said plurality of control signals.

10. A processor fabricated on a single semiconductor substrate comprising:
AND array means for receiving program instructions from input sources external of the processor and for generating product signals;
OR array means interconnected to said AND array means for receiving said product signals and for generating a plurality of control signals;
register means for receiving ones of said plurality of control signals and for transferring data between the processor and data sources external of the processor;
arithmetic and logic unit means interconnected to said register means and said OR array means, for executing operations on data received from said register means in accordance with ones of said plurality of control signals and for generating output data;
control register means interconnected to said OR array means and said AND array means for receiving ones of said plurality of control signals for controlling execution of said program instructions within said AND array means; and
code register means interconnected to said arithmetic and logic unit means for storing condition code information generated by said arithmetic and logic unit means for application to said AND array means.

11. A processor fabricated on a single semiconductor substrate comprising:
AND array means for receiving program instructions from input sources external of the processor and for generating product signals;
OR array means interconnected to said AND array means for receiving said product signals and for generating a plurality of control signals;
register means for receiving ones of said plurality of control signals and for transferring data between the processor and data sources external of the processor;
arithmetic and logic unit means interconnected to said register means and said OR array means, for executing operations on data received from said register means in accordance with ones of said plurality of control signals and for generating output data;
control register means interconnected to said OR array means and said AND array means for receiving ones of said plurality of control signals for controlling execution of said program instructions within said AND array means; and
wherein ones of said plurality of control signals are connected from said OR array means to input/output devices external of the processor.

12. A processor fabricated on a single semiconductor substrate comprising:
AND array means for receiving program instructions from input sources external of the processor and for generating product signals;
OR array means interconnected to said AND array means for receiving said product signals and for generating a plurality of control signals;
register means for receiving ones of said plurality of control signals and for transferring data between the processor and data sources external of the processor;
arithmetic and logic unit means interconnected to said register means and said OR array means, for executing operations on data received from said register means in accordance with ones of said plurality of control signals and for generating output data;
control register means interconnected to said OR array means and said AND array means for receiving ones of said plurality of control signals for controlling execution of said program instructions within said AND array means; and
said arithmetic and logic unit means comprises programmable logic array means.

13. A processor comprising:
AND array means for receiving program instructions, clock pulses and interrupt signals from input sources external of the processor and for generating product signals;
OR array means interconnected to said AND array means for receiving said product signals and for generating a plurality of control signals;
register array means for receiving ones of said plurality of control signals and for transferring data between the processor and data sources external of the processor;
arithmetic and logic unit array means interconnected to said register array means and said OR array means for executing operations on data received from said register array means in accordance with ones of said plurality of control signals for generating output data;

control register array means interconnected to said OR array means and said AND array means for receiving ones of said plurality of control signals for controlling execution of said program instructions within said AND array means;

output register array means interconnected to receive said output data and ones of said plurality of control signals for buffering said output data between said arithmetic and logic unit array means and data sources external of the processor under control of ones of said plurality of control signals;

multiplexer register array means interconnected to said register array means and to data sources external of the processor for controlling flow of data to said register array means under control of ones of said plurality of control signals;

code register array means interconnected to said arithmetic and logic unit array means for storing code condition information generated by said arithmetic and logic unit array means for application to said AND array means; and all said array means being fabricated on a single semiconductor substrate.

14. The processor of claim 13 wherein the size of all said array means are selectively variable.

15. The processor of claim 8 wherein said control register array means controls simultaneous execution of a plurality of said program instructions.

16. The processor of claim 8 wherein said AND array means and said OR array means are dynamically programmable.

17. A processor fabricated on a single semiconductor substrate comprising:

AND array means for receiving input signals from sources external of the processor and for generating outputs along product signal lines;

OR array means disposed adjacent to said AND array means on the semiconductor substrate and interconnected to said product lines for generating control signals along control lines disposed perpendicular to said product lines;

register array means disposed adjacent to said OR array means on the semiconductor substrate for receiving said control signals and for generating data along register signal lines;

said register signal lines being disposed perpendicular to said control signal lines;

arithmetic and logic unit array means disposed adjacent said register array means and said AND array means for receiving said data from said register array means along said register signal lines for generating output data;

control register means interconnected to said OR array means and said AND array means for receiving said control signals; and output register means interconnected to receive said output data from said arithmetic and logic unit array means and said control signals for buffering said output data between said arithmetic and logic unit array means and data sources external of the processor under control of said control signals.

18. The processor of claim 17 wherein said product signal lines are disposed parallel to said register signal lines.

19. The processor of claim 17 wherein said OR array means is disposed laterally adjacent to said AND array means, said register array means is disposed below said OR array means and said arithmetic and logic unit array means is disposed laterally adjacent said register array means and below said AND array means.

20. A processor fabricated on a single semiconductor substrate for operating on data, said processor comprising:

AND array means, responsive to the application thereto of a coded input signal from means external to said substrate, for providing a coded product signal having a coded state related to the code of said input signal, said product signal being provided to product signal conduction paths positioned generally along a linear path on said substrate;

said means external to said substrate for applying said coded input signal including clock means;

OR array means positioned on said substrate to be connected with said product signal conduction paths for receiving said product signal and generating a coded control signal on control signal conduction paths, the coded state of said control signal being related to the state of said products signal, said control signal conduction paths being positioned generally along a linear path substantially perpendicular to said product signal conduction paths;

register array means, positioned on said substrate connected with at least a first portion of said control signal conduction paths, for affecting the reception or provision of said data on data conduction paths in accordance with the state of said control signal on said first portion of said control signal conduction paths, said data conduction paths being positioned generally along a linear path substantially perpendicular to said control signal conduction paths; and output means, positioned on said substrate connected with said data conduction paths and at least a second portion of said control signal conduction paths, for providing data to said data conduction paths from said external means or to said external means from said data conduction paths in accordance with the state of said control signal on said second portion of said control signal conduction paths.

21. A processor fabricated on a single semiconductor substrate for operating on data, said processor comprising:

AND array means, responsive to the application thereto of a coded input signal from means external to said substrate, for providing a coded product signal having a coded state related to the code of said input signal, said product signal being provided to product signal conduction paths positioned generally along a linear path on said substrate;

OR array means positioned on said substrate to be connected with said product signal conduction paths for receiving said product signal and generating a coded control signal on control signal conduction paths, the coded state of said control signal being related to the state of said products signal, said control signal conduction paths being positioned generally along a linear path substantially perpendicular to said product signal conduction paths;

register array means, positioned on said substrate connected with at least a first portion of said control signal conduction paths, for affecting the reception or provision of said data on data conduction paths in accordance with the state of said control signal on said first portion of said control signal conduction paths, said data conduction paths being positioned generally along a linear path substantially perpendicular to said control signal conduction paths;

output means, positioned on said substrate connected with said data conduction paths and at least a second portion of said control signal conduction paths, for providing data to said data conduction paths from said external means or to said external means from said data conduction paths in accordance with the state of said control signal on said second portion of said control signal conduction paths; and said output means is structured as an array.

22. The processor according to claim 21 wherein said AND array and said OR array are programmable to provide a desired coded product signal and coded control signal in response to a given code for said input signal.

23. The processor according to claim 21 wherein said AND array and said OR array are programmable logic arrays.

24. The processor according to claim 21 wherein said product signal conduction paths and said data conduction paths are one of metal patterns or diffusion regions and said control signal conduction paths are the other of metal patterns or diffusion regions.

25. The processor according to claim 21 wherein said processor is self clocking in response to the change in the code of said input signal.

26. The processor according to claim 21 wherein said input signal includes interrupt signals.

27. The processor according to claim 21 and further comprising:

arithmetic and logic means, positioned on said substrate to be connected with said data conduction paths and at least a third portion of said control signal conduction paths, for performing arithmetic and logical operations on the data applied thereto over said data conduction paths in accordance with the state of said control signal on said third portion of control signal conduction paths, said arithmetic and logic means providing a data signal at an output thereof manifesting the results of the operation performed thereby, said output being connected by a conduction path to said output means, said output means providing the data manifested at the output of said arithmetic and logic means to said register array means or said external means in accordance with the state of said control signal on said second portion of said control signal conduction paths.

28. The processor according to claim 27 and further comprising:

condition code register means connected to and responsive to the operations performed by said arithmetic and logic means for providing signals to said AND array to control the code of the product signal provided thereby, said coded input signals and said condition code register signals being provided to said AND array means along conductive paths positioned on said substrate generally parallel to said control signal paths.

29. A processor fabricated on a single semiconductor substrate for operating on data, said processor comprising:

AND array means, responsive to the application thereto of a coded input signal from means external to said substrate, for providing a coded product signal having a coded state related to the code of said input signal, said product signal being provided to product signal conduction paths positioned generally along a linear path on said substrate;

OR array means positioned on said substrate to be connected with said product signal conduction paths for receiving said product signal and generating a coded control signal on control signal conduction paths, the coded state of said control signal being related to the state of said products signal, said control signal conduction paths being positioned generally along a linear path substantially perpendicular to said product signal conduction paths;

register array means, positioned on said substrate connected with at least a first portion of said control signal conduction paths, for affecting the reception or provision of said data on data conduction paths in accordance with the state of said control signal on said first portion of said control signal conduction paths, said data conduction paths being positioned generally along a linear path substantially perpendicular to said control signal conduction paths;

output means, positioned on said substrate connected with said data conduction paths and at least a second portion of said control signal conduction paths, for providing data to said data conduction paths from said external means or to said external means from said data conduction paths in accordance with the state of said control signal on said second portion of said control signal conduction paths; and controller means, positioned on said substrate to be connected to at least a third portion of said control signal conduction paths, for providing signals to control the code of the product signals provided by said AND array means in accordance with the state of said control signal on said third portion of said control signal conduction paths, said controller means signals being provided along conductive paths positioned between said controller means and said AND array means along a path substantially perpendicular to said product signal conduction paths.

30. The processor according to claim 28 wherein said coded input signals are provided to said AND array means along conduction paths parallel to said controller means output signal conduction paths.

31. The processor according to claim 28 wherein said controller means is structured as an array.

32. A processor fabricated on a single semiconductor substrate for operating on data, said processor comprising:

AND array means, responsive to the application thereto of a coded input signal from means external to said substrate, for providing a coded product signal having a coded state related to the code of said input signal, said product signal being provided to product signal conduction paths positioned generally along a linear path on said substrate;

OR array means positioned on said substrate to be connected with said product signal conduction paths for receiving said product signal and generating a coded control signal on control signal conduction paths, the coded state of said control signal being related to the state of said products signal, said control signal conduction paths being positioned generally along a linear path substantially perpendicular to said product signal conduction paths;

register array means, positioned on said substrate connected with at least a first portion of said control signal conduction paths, for affecting the reception or provision of said data on data conduction paths in accordance with the state of said control signal on said first portion of said control signal conduction paths, said data conduction paths being positioned generally along a linear path substantially perpendicular to said control signal conduction paths;

output means, positioned on said substrate connected with said data conduction paths and at least a second portion of said control signal conduction paths, for providing data to said data conduction paths from said external means or to said external means from said data conduction paths in accordance with the state of said control signal on said second portion of said control signal conduction paths; and said output means includes multiplexer means.

33. The processor according to claim 32 wherein said output means further includes output register means connected to said multiplexer means.

34. The processor according to claim 33 wherein said multiplexer means and said output register means are structured as arrays.

* * * * *

UNITED STATES PATENT AND TRADEMARK OFFICE
CERTIFICATE OF CORRECTION

PATENT NO. : 4,354,228

DATED : October 12, 1982

INVENTOR(S) : Victor S. Moore, et al.

It is certified that error appears in the above—identified patent and that said Letters Patent is hereby corrected as shown below:

Column 13, line 26, "claim 8" should be --claim 13--;

Column 13, line 29, "claim 8" should be --claim 13--;

Column 16, line 50, "claim 28" should be --claim 29--;

Column 16, line 54, "claim 28" should be --claim 29--.

Signed and Sealed this

First Day of February 1983

[SEAL]

Attest:

Attesting Officer

GERALD J. MOSSINGHOFF

Commissioner of Patents and Trademarks